US007282699B2

(12) United States Patent
Atsuta et al.

(10) Patent No.: US 7,282,699 B2
(45) Date of Patent: Oct. 16, 2007

(54) OPTICAL ENCODER FOR IMPROVED DETECTION OF THE ABSOLUTE POSITION OF AN ORIGIN POINT

(75) Inventors: Akio Atsuta, Yokosuka (JP); Masahiko Igaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/341,627

(22) Filed: Jan. 30, 2006

(65) Prior Publication Data

US 2006/0192092 A1  Aug. 31, 2006

(30) Foreign Application Priority Data

Feb. 4, 2005  (JP) .............................. 2005-029336

(51) Int. Cl.
*G01D 5/34* (2006.01)
(52) U.S. Cl. ................................. 250/231.13
(58) Field of Classification Search .............................. 250/231.13–231.18, 237 G; 341/13
See application file for complete search history.

(56) References Cited

U.S. PATENT DOCUMENTS

| 4,518,859 A | * | 5/1985 | Hoshika | ................ 250/231.14 |
| 5,155,355 A | | 10/1992 | Kabaya | ................... 250/237 G |
| 5,359,193 A | | 10/1994 | Nyui et al. | .............. 250/237 G |
| 5,481,106 A | | 1/1996 | Nyui et al. | .............. 250/237 G |
| 5,483,059 A | | 1/1996 | Igaki et al. | ............. 250/231.16 |
| 5,852,413 A | * | 12/1998 | Bacchi et al. | ................. 341/13 |
| 6,639,207 B2 | | 10/2003 | Yamamoto et al. | .... 250/231.14 |
| 6,891,150 B2 | | 5/2005 | Takayama et al. | ..... 250/231.13 |
| 6,975,408 B2 | | 12/2005 | Igaki et al. | .................. 356/616 |

FOREIGN PATENT DOCUMENTS

| JP | 06-056304 | 3/1994 |
| JP | 2002-323347 | 11/2002 |
| JP | 2003-161645 | 6/2003 |

* cited by examiner

*Primary Examiner*—Thanh X. Luu
(74) *Attorney, Agent, or Firm*—Fitzpatrick, Cella, Harper & Scinto

(57) ABSTRACT

Two detection heads are arranged opposite to each other with respect to a scale. On the scale, there is provided a discontinuous portion formed in a reflecting portion to enable detection of original point position. The original point is determined by detecting the discontinuous portion by one detection head. The absolute position of the original position in measurement is determined additionally taking into account a signal output from the other detection head at that time. Position information is calculated with reference to that absolute position to thereby reduce positional displacement of the original point that may be caused by environmental changes etc.

4 Claims, 11 Drawing Sheets

OPTICAL ENCODER FOR IMPROVED DETECTION OF THE ABSOLUTE POSITION OF AN ORIGIN POINT

BACKGROUND OF THE INVENTION

1. Field of the Invention

The present invention relates to an optical encoder for use in measuring displacement or angle.

2. Related Background Art

An optical encoder has a main scale on which a first optical grating is formed, an index scale on which a second optical grating is formed, the index scale being opposed to the main scale, and a light source for illuminating the main scale with light.

The optical encoder is provided with a light receiving element for receiving light that has been transmitted or reflected by the optical grating of the main scale and transmitted through the optical grating of the index scale.

Use of a light receiving element array that also functions as an index scale in this type of optical encoders has already been proposed by Japanese Patent Publication No. 6-056304

The inventor of the present invention has filed patent applications, for example Japanese Patent Application Laid-Open No. 2003-161645, concerning encoders having the above-described structure.

Figure 12:
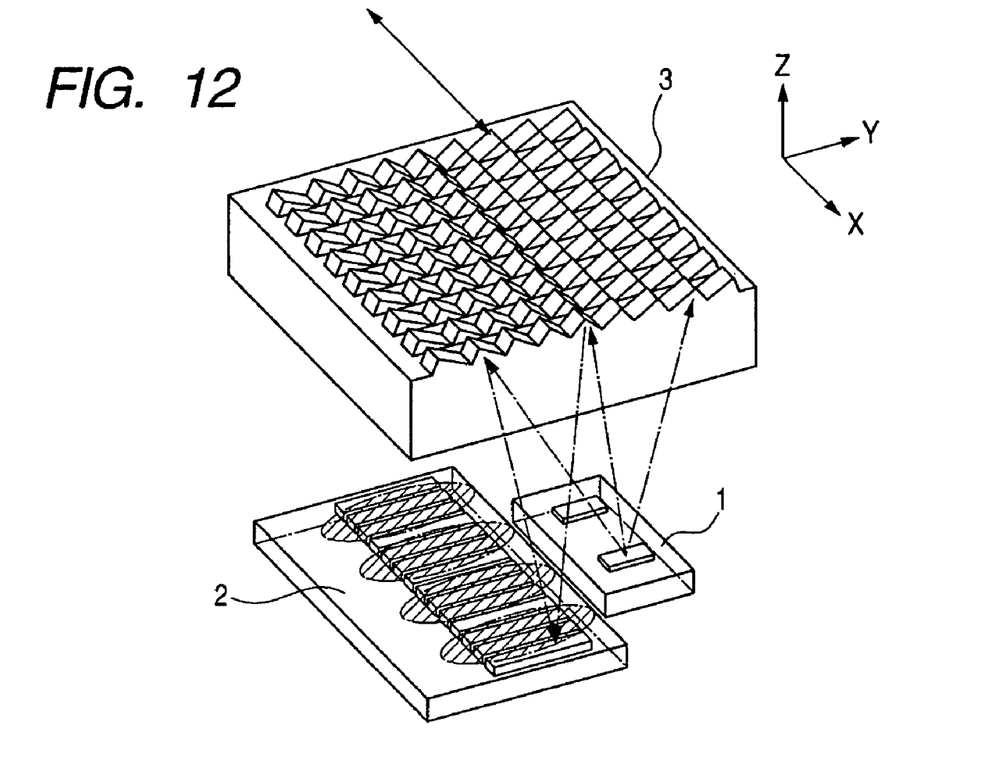
FIG. 12 shows the structure of a conventional encoder using a micro roof mirror array.

FIG. 12 shows the structure of an reflection type optical encoder, in which a scale is formed by using a micro roof mirror array to enhance utilization efficiency of light.

A structure that uses such a micro mirror array is disclosed in Japanese Patent Application Laid-Open No. 2002-323347.

This structure includes a light emitting element 1, a light receiving element 2 and a scale 3 as a moving member that uses micro roof mirrors.

Light emitted from the light emitting element 1 is reflected by the scale 3 including reflecting portions and non-reflecting portions arranged with small intervals to form bright portions and dark portions distributed on a row of the light receiving element 2.

In connection with this, if the scale 3 is not a structure using the micro roof mirror array but a structure including simple reflecting and non-reflecting portions, a similar distribution of bright and dark portions is formed on the light receiving element 2.

The encoder having this structure is referred to as an incremental type encoder, in which pulses are output in accordance with movement of the scale 3 and it is possible to detect the displacement amount of the scale 3 by counting the pulses.

The incremental type encoder has the problem that the absolute rotational angle position cannot be detected and it is necessary to provide a separate sensor for detecting the absolute position in addition to the encoder.

To overcome this problem, the following structure has been devised.

Figure 13:
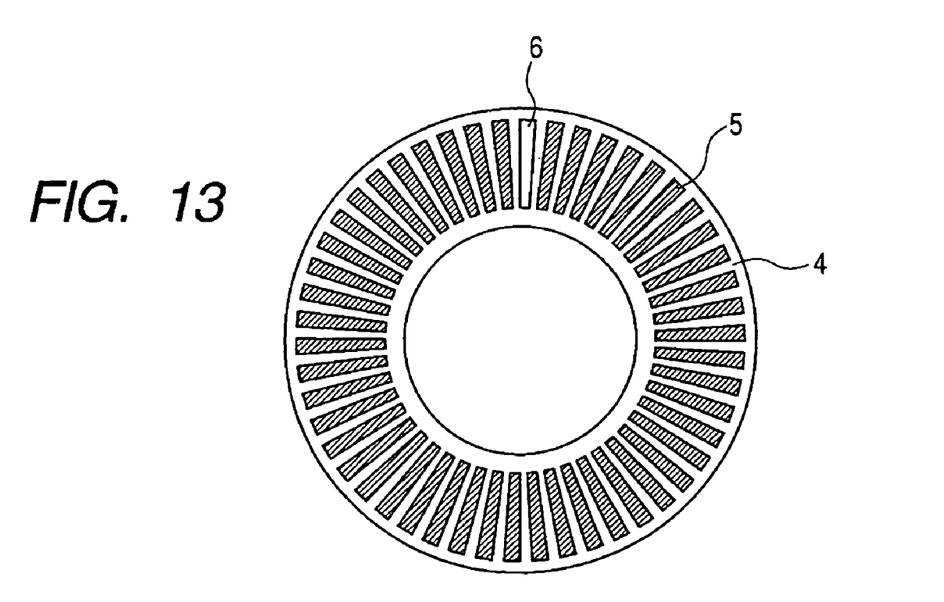
FIG. 13 shows a scale used for detecting an absolute position.

FIG. 13 shows a scale for detecting the absolute position in such incremental type encoders.

Specifically, radial reflecting portions are arranged on a scale 4 at regular intervals. In this scale 4, a missing portion 6 in which the reflecting portion is missing is partly formed.

Figure 14:
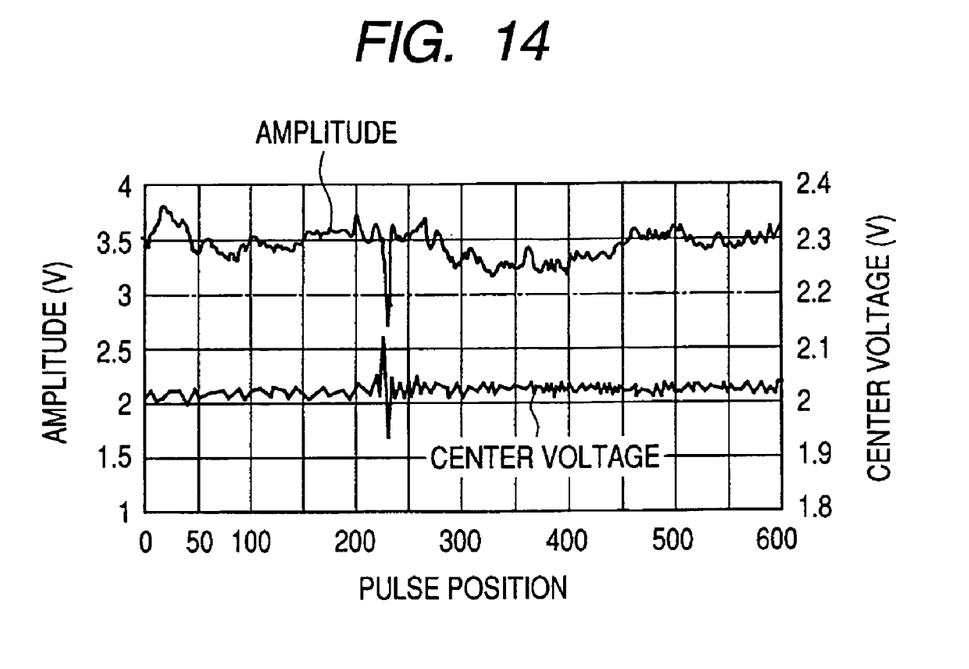
FIG. 14 shows waveforms of a signal amplitude and a center voltage including points of variation.

When this scale 4 and a detection sensor using a photo diode array are used in combination and an analogue signal is read timed with a digital signal, points of change in the amplitude and central voltage of the analogue signal shown in FIG. 14 can be determined.

At the time when the missing portion 6 of the scale 4 passes by the detection sensor, contrast on the detection sensor decreases, which leads to a decrease in the amplitude of the signal. In other words, changes in the signal level of the central voltage occur when the missing portion 6 of the scale 4 enters and gets out of the area of the detection sensor.

Figure 15:
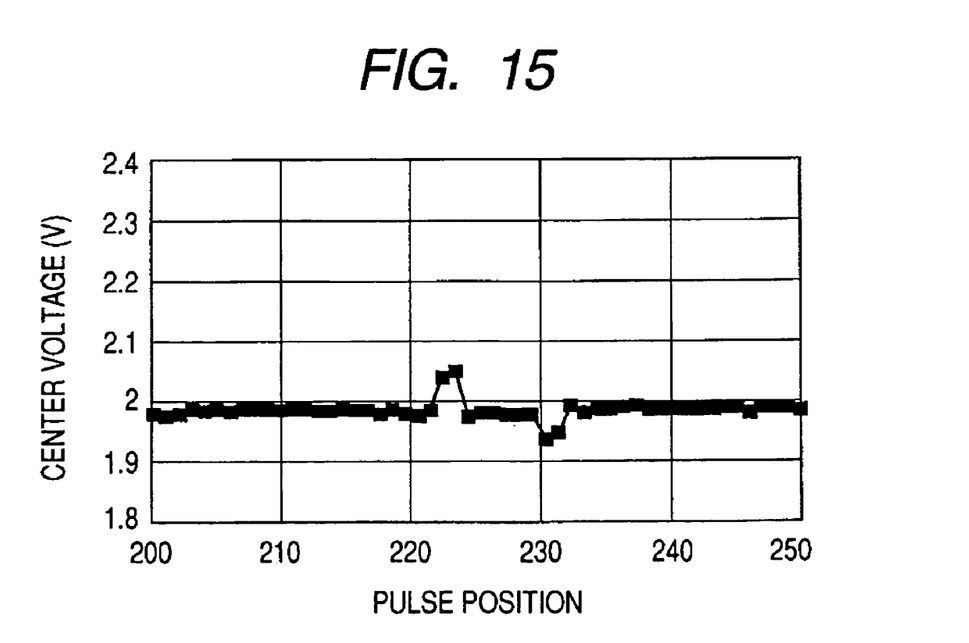
FIG. 15 shows a waveform of the central voltage in an enlarged manner.

FIG. 15 shows a waveform of the central voltage in an enlarged manner. Based on this waveform, it is possible to detect a changing amount of detected signals accurately.

When the missing portion 6 passes through a predetermined detecting position while a light quantity feedback operation is effected to make the light quantity constant, a decrease in the light quantity occurs.

To compensate the decrease in the light quantity, current supplied to an LED may be increased.

At that time, the current comes to a peak, and it is also possible to detect the original point by detecting the change in the current value.

Alternatively, a point at which the differential value of the signal becomes zero may be determined instead of using the means for detecting the above mentioned peak of the varying signal.

However, in the absolute position detection means of the optical encoder that has been described above as a prior art, although the position of the original point can be determined, there is a problem that the absolute position of the original point can be displaced due to a variation in the positional relationship between the detection head and the scale that may be caused, for example, by a change in the environmental temperature.

SUMMARY OF THE INVENTION

An object of the present invention is to eliminate the problem described above and to provide an optical encoder that can detect the absolute position of the original point accurately without suffering from variations in the positional relationship between a detection head and a scale.

To achieve the above object, an optical encoder according to the present invention is characterized by a scale having a sector or disk-like shape on which an optical grating including a discontinuous portion is formed, a light source for illuminating the scale with light and a detection head that is movable relative to said scale and has plurality of light receiving sensors arranged in correlation with the pitch of said optical grating to receive light diffracted by said optical grating.

Further, a discontinuous portion is provided in the optical grating of said scale, and first and second detection heads each of which having a plurality of light receiving sensors are arranged at opposite positions forming an angle of approximately 180 degrees with respect to the rotation center of said scale.

An original point position is determined based an a change in an encoder signal that is output from at least one of the first and second detection heads as the discontinuous portion of said scale passes said detection head.

Moreover, position information is determined by calculative processing effected on encoder signals output from said first and second encoders with reference to the original point position.

In the optical encoder according to the present invention, a plurality of detection heads are provided at positions forming an angle of 180 degree relative to the scale position and original point position information is determined based on a result of calculation effected on signals output from two detection heads. With such features, it is possible to determine an absolute position of the original point accurately with a simple structure without influences of temperature changes etc.

The above and other objects, features and advantages of the invention will become more apparent from the following detailed description of taken in conjunction with the accompanying drawings.

DESCRIPTION OF THE PREFERRED EMBODIMENTS

The present invention will be described in detail based on embodiments shown in FIGS. 1 to 8.

First Embodiment

Figure 1:
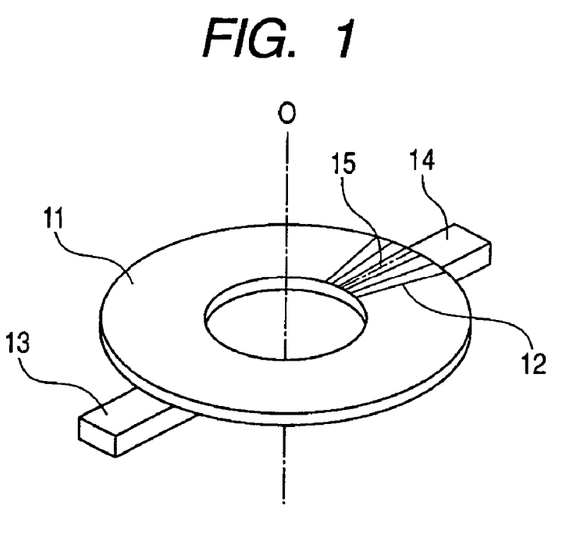
FIG. 1 shows the structure of a reflection type rotary encoder according to a first embodiment.

FIG. 1 shows the structure of the first embodiment.

A disk-like scale 11 of a reflecting type rotary encoder has radial reflecting portions 12 arranged at regular intervals and rotates about the axis O at its center.

First and second heads 13 and 14 that detect reflected light from the scale 11 to obtain position information are disposed with a mutual angular position difference of 180 degrees with respect to the rotation center of the scale 11.

A discontinuous portion 15 is formed instead of a part of the reflective portions 12 of the scale 11, and the original point is determined by detecting that discontinuous portion 15.

Figure 2:
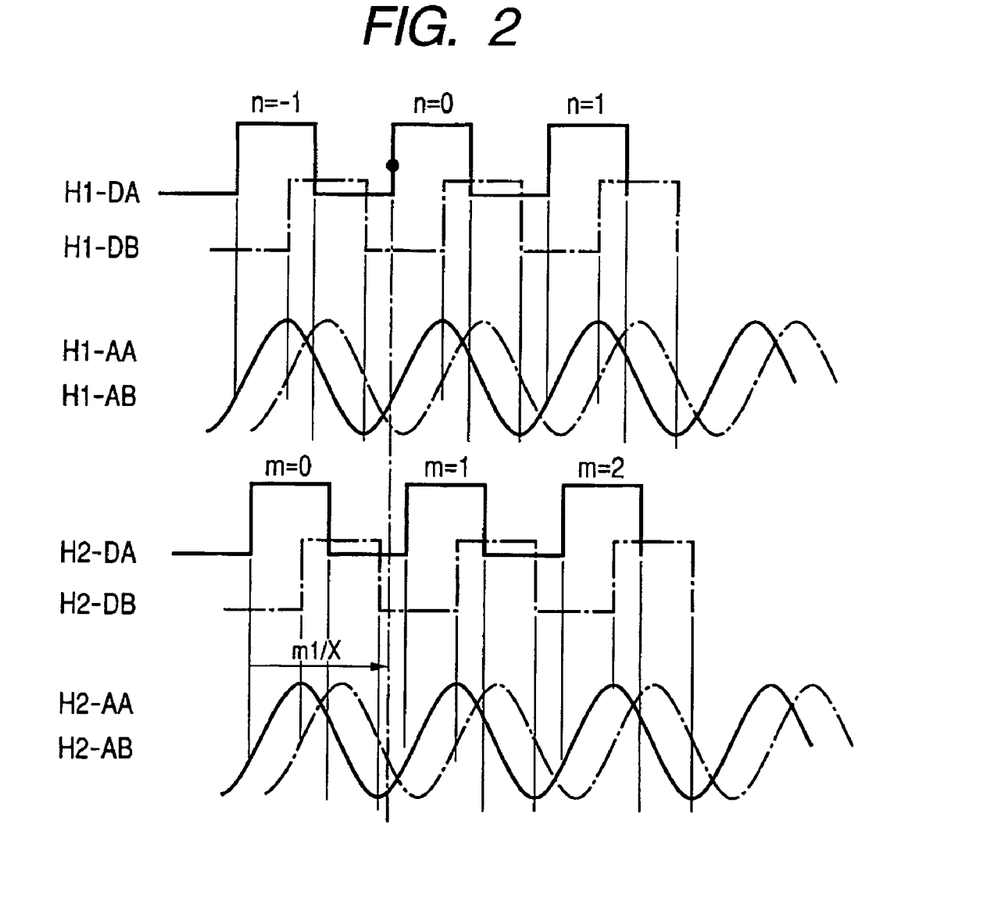
FIG. 2 is waveform chart of signals obtained from two detection heads.

FIG. 2 is a time chart showing the waveforms of signals obtained by the first and the second detection heads 13 and 14 in relation to time.

In FIG. 2, signals designated by H1 are signals output from the first detection head 13, and signals designated by H2 are signals output form the second detection head 14, where DA denotes a digital A-phase signal, DB denotes a digital B-phase signal, AA denotes an analogue A-phase signal and AB denotes an analogue B-phase signal.

Figure 3A:
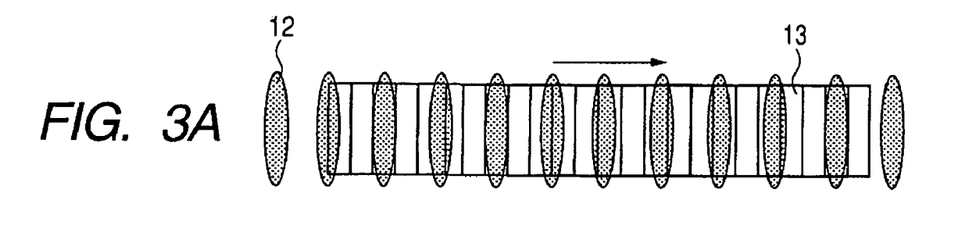
FIGS. 3A, 3B and 3C illustrate positional relationship between light receiving sensors and light distributions at some times while a discontinuous portion passes over a detection head.
Figure 3B:
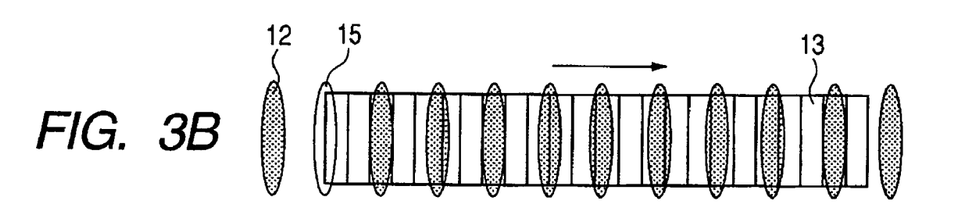
Figure 3C:
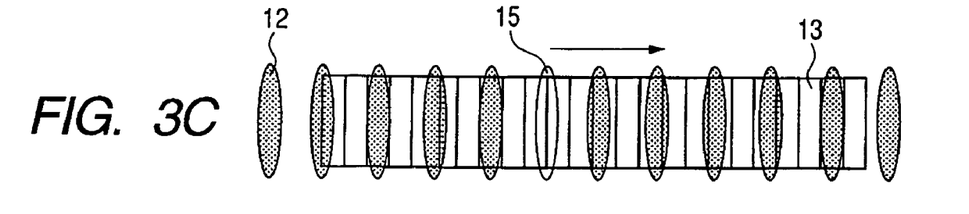

FIGS. 3A to 3C schematically illustrate relative positional relationship between light receiving sensors that constitute the first detection head 13 and light distributions formed by light that has been emitted from the light source and reflected by the scale 11 having the reflecting portions 12 and the discontinuous portion 15.

The first and the second detection head 13 and 14 have the same configuration.

Encoder output signals having different phases, i.e. A-phase, B-phase, A'-phase and B'-phase, are detected respectively.

For that purpose, six sets of light receiving sensors, each set including four light receiving sensors, are arranged. Namely, twenty-four light receiving sensors are arranged in all.

The discontinuous portion 15 may be formed for example by eliminating one of the reflecting portions 12 of the scale 11 or a few consecutive reflecting portions 12.

FIG. 3A shows a normal detection state in which the discontinuous portion 15 of the scale 11 is not in the sensing area of the first detection head 13.

FIG. 3B shows a state at a time at which the discontinuous portion 15 of the scale 11 is passing an end of the sensing area of the detection head 13.

FIG. 3C shows a state in which the discontinuous portion 15 is fully in the sensing area of the detection head 13.

The output signals H1 and H2 shown in FIG. 2 are obtained through the first and the second detection heads 13 and 14 in every state shown in FIGS. 3A to 3C although there are variations in their amplitude characteristics etc., as is the case with conventional rotary encoders.

Here, output signals of the first detection head 13 will be described in detail.

As shown in FIG. 3B, when the discontinuous portion 15 passes an end of the sensing area of the detection head 13, unbalance in the output signals of the first detection head occurs. Accordingly, a change in the average value of the output signals occurs.

However, while the discontinuous portion 15 is fully in the sensing area as shown in FIG. 3C not to mention while the discontinuous portion 15 is not in the sensing area as shown in 3A, such unbalance does not occur.

Therefore, it is possible to detect the discontinuous portion 15 by means of the first detection head 13 by detecting the unbalance of the output signals. The original point can be determined based on this principle.

In the first embodiment, the discontinuous portion 15 is detected by detecting an offset of the central voltage of a signal output from the first detection head 13.

Specifically, the maximum value of the analogue A-phase signal H1-AA is read at a rising edge of the digital B-phase signal H1-DB that is output from the first detection head.

The minimum value of the analogue A-phase signal H1-AA is read at a falling edge of the digital B-phase signal H1-DB.

It is possible to determine the amplitude by calculating the difference of these two values. In addition, it is possible to detect a variation in the central voltage by calculating the average of them.

In connection with the above, when the rotation direction of the scale is reversed, the positional relationship between the edges of the B-phase digital signals and the maximum and the minimum values of the A-phase analogue signals are reversed.

As per the above, by detecting an offset of the central voltage based on a change in the amplitude of the analogue A-phase signal H1-AA, it is possible to detect the discontinuous portion 15.

In the above-described way of detection, influence of temperature variations and assembly errors can be eliminated.

When the discontinuous portion 15 provided on the scale 11 is detected by the first detection head 13, the rising edge of the digital A-phase signal H1-DA output from the first detection head 13 is set as the original point.

In FIG. 2, point n=0 is set as the original point position.

In order to further enhance the resolution of position information read from the analogue signals H2-AA and H2AB output from the second detection head 14, a value obtained by electrically dividing the analogue signal is added to a digital value with a certain weighting.

For example, if one cycle of a digital signal is divided into X divisions, position calculated from the analogue A-phase and B-phase signals output form the second detection head when the original position is detected is generally expressed as m1/X.

If for example, m1 is position of 860 in divisions X=1000, the position of the analogue A-phase signal H2 is 0.86.

Here, the position information determined from the first and the second detection heads 13 and 14 are n=0 and m=0.86, and the average value of the position information obtained from the first and second detection heads 13 and 14 is (0+0.86)/2=0.43.

Therefore, this position should be used as the absolute position of the original point of the measurement in measuring a displacement amount.

Figure 4:
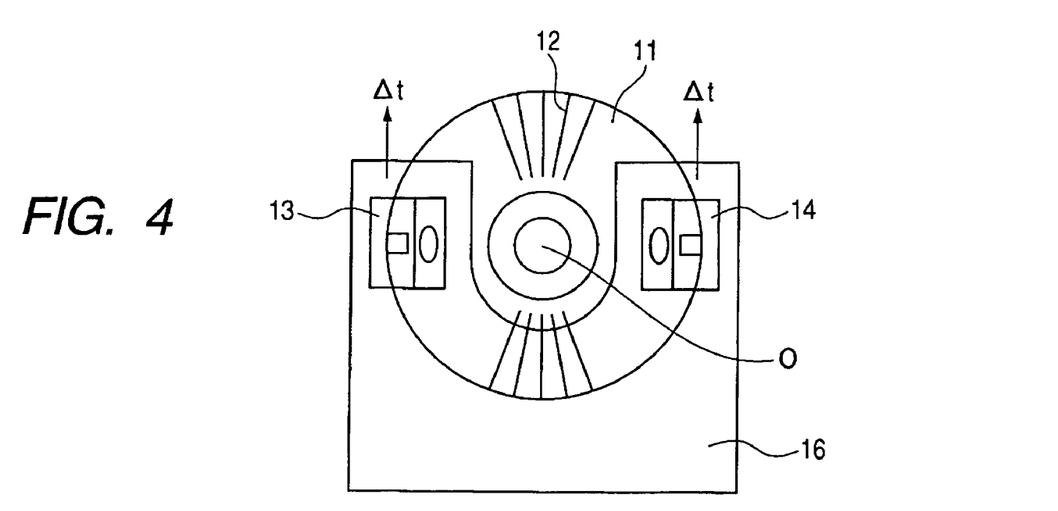
FIG. 4 is a plan view showing positional relationship between the detection heads and the scale.

FIG. 4 is a plan view showing positional relationship between the first and the second detection heads 13 and 14 and the scale 11.

The first and the second detection heads 13 and 14 are mounted on a base plate 16. The base plate 16 is disposed in such a way that the first and the second detection heads 13 and 14 are disposed at opposite positions (forming an angle of 180 degree) with respect to the rotation center of the scale 11.

Figure 5:
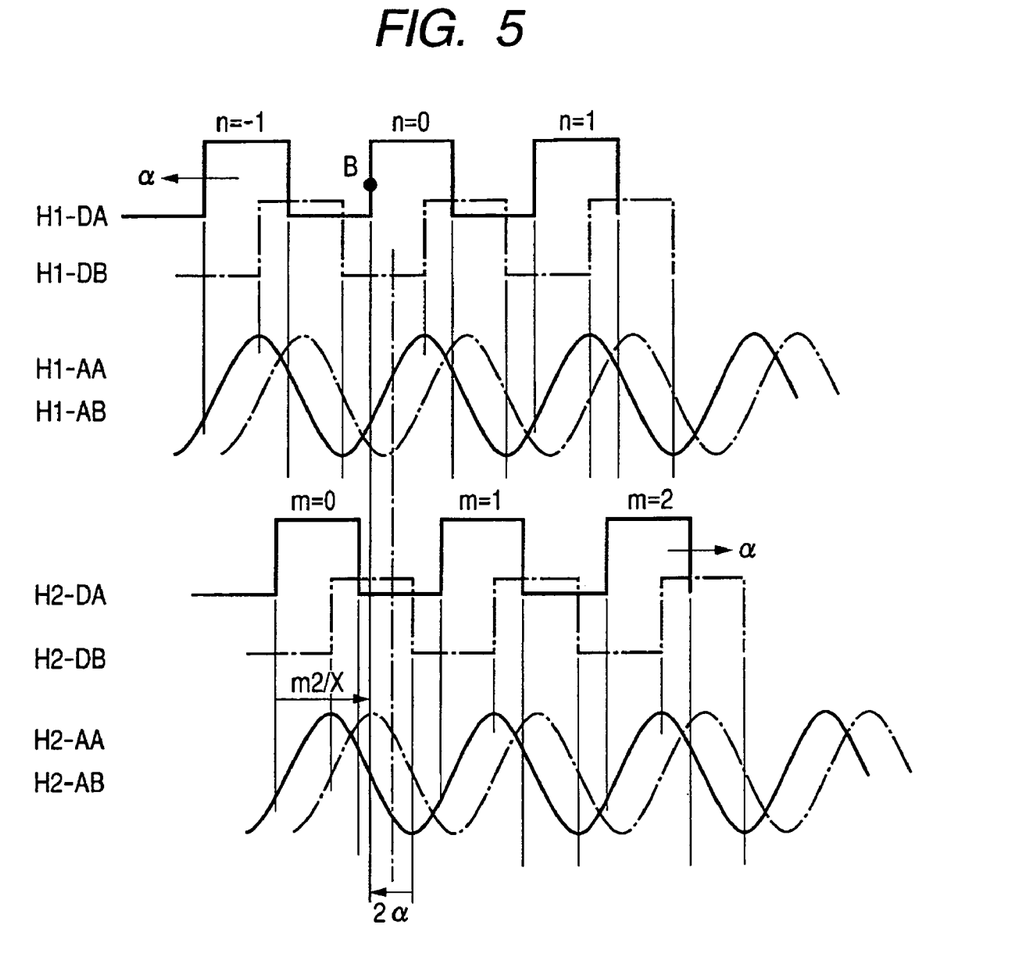
FIG. 5 is a waveform chart of signals in a case where the base plate has been displaced.

FIG. 5 is a waveform chart similar to FIG. 2 showing a case where the base plate 16 has expanded or contracted in the direction indicated by arrows Δt in FIG. 4 due to a change in the environment.

In the case where the first and the second heads 13 and 14 move parallel in the direction indicated by arrows Δt, the output signals H1 from the first detection head 13 shift in the direction in which the phase is advanced by α from those before the environmental change.

In contrast, the output signals H2 from the second detection head 14 shift in the direction in which the phase is delayed by α.

In this case also, the discontinuous portion 15 or the original point is detected with reference to the output signal H1 from the first detection head 13, and therefore, the position of point B at the rising edge of the digital A-phase signal H1-DA is determined as the original point (n=0).

In this case, position information is obtained as half the sum of the position determined based on the output signals H1 from the first detection head 13 ("position H1") and the position determined based on the output signals H2 from the second detection head 14 ("position H2").

Therefore, the position is (n+m+m2/X)/2=(n+m+m1/X−2α)/2, that is, if for example α is assumed to be 200 in 1000 divisions, (0+0+0.86−0.4)/2=0.23.

Thus, the position B that is determined as the original point (n=0) in FIG. 5 is at a position displaced from the data before the environmental change by a phase α, as will be understood.

Accordingly, if position information obtained from signals output from the first and the second detection heads 13 and 14 is corrected by a value corresponding to the phase displacement α, the original point in measurement may be set at the position same as that before the environmental change. Therefore, it is possible to measure displacement amount correctly without being influenced by environmental changes.

Second Embodiment

In the first embodiment, the counter is reset at the original point position determined based on the detection signals of the first detection head 13. On the other hand, in the second embodiment, the result of calculation of position information obtained from the first and the second detection heads 13 and 14 upon initialization is set to zero, and a correction value therefor is stored.

When the count value is set to zero at the original point detected by the first detection head 13, the digital value of the second detection head 14 becomes zero.

Nevertheless, there is an analogue displacement (m1/X), and therefore the original point position does not becomes the position of zero.

In view of this, in the second embodiment, half the sum of the position information obtained from the first and the second detection heads 13 and 14 at the original point position of the first detection head 13 is calculated, and a correction value that makes the calculation result zero is determined and stored.

In the next and subsequent measurements, this stored value is subtracted from calculation results of position information obtained from the first and the second detection heads 13 and 14.

Figure 6:
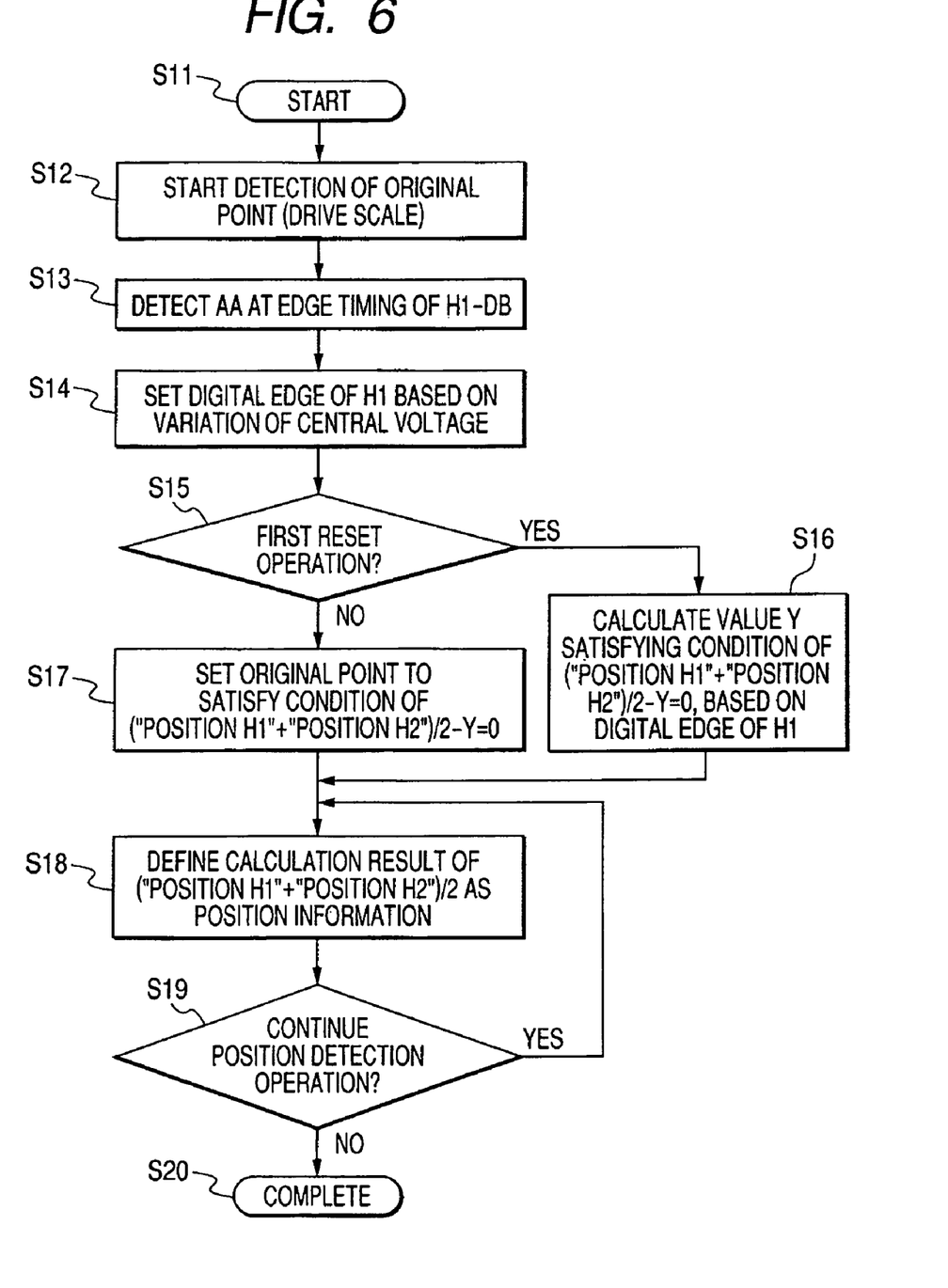
FIG. 6 is a flow chart of an algorithm of a method of detecting the original point in a second embodiment.

FIG. 6 is a flow chart of the algorithm of the position detection process in the second embodiment.

When measurement is started (step S11), the scale 11 is turned to search the original point position (step S12).

Next, for example at the time of a rising edge and a falling edge of the digital B-phase signal H1-DB output from the first detection head 13, the analogue A-phase signal H1-AA is read in (step S13).

Thus, signal values at the peak and valley of the analogue A-phase signal H1-AA are obtained, and it is possible to determine the central voltage as ("peak value"+"valley value")/2.

When the discontinuous portion 15 of the scale 11 enters the sensing area of the first detection head 13, the level of the central voltage changes and an offset occurs.

To eliminate its influence, the position of rising of the digital A-phase signal H1-DA just after the position at which the offset of the central voltage occurs is set as the original point position (step S14).

A determination is made as to whether the current operation is the first reset operation or not (step S15).

If it is the first reset operation, the process proceeds to the algorithm of step S16.

Then, the average value ("position of signal H1"+"position of signal H2")/2 is determined in accordance with the above described calculation based on the signals H1 and H2 output from the first and second detection heads 13 and 14 at that position.

In addition, value Y that satisfies the following condition is determined and stored: "the average value obtained as above"−Y=0 (step S16).

Thus, the initializing operation for detecting the original position is completed. In the next original point detection operation, the value Y obtained in step 16 is set to the original point position.

If the current operation is not the first reset operation, the value {("position of signal H1"+"position of signal H2")/2}−Y is calculated, and the position at which the calculated value becomes zero is the original point position determined in the initializing operation (step S17).

Therefore, if the scale 11 is to be stopped at the original point, its rotational angle should be controlled so that the result of the above calculation becomes zero.

After that, position information is defined as the result of the calculation ("position of signal H1"+"position of signal H2")/2 during normal operation (step S18).

A determination is made as to the position detection operation is to be continued or not (step S19), and if needed, the position detection operation is continued. the measurement is ended when position detection becomes unnecessary (step S20).

In the first embodiment, since the position at which the value of half the sum of the values obtained from the first and the second detection heads 13 and 14 becomes zero is set as the zero position, the zero position obtained by calculation varies depending on the positional relationship of the heads. On the other hand, in the second embodiment, the original point is set to a position that is determined in the initialization operation, which is for example a position determined in the state in which the scale is stopped by a mechanical stop. Therefore, variations depending on the apparatus do not occur.

Furthermore, the positioning control program can also use the same target value, and it can be simplified advantageously.

Third Embodiment

Figure 7:
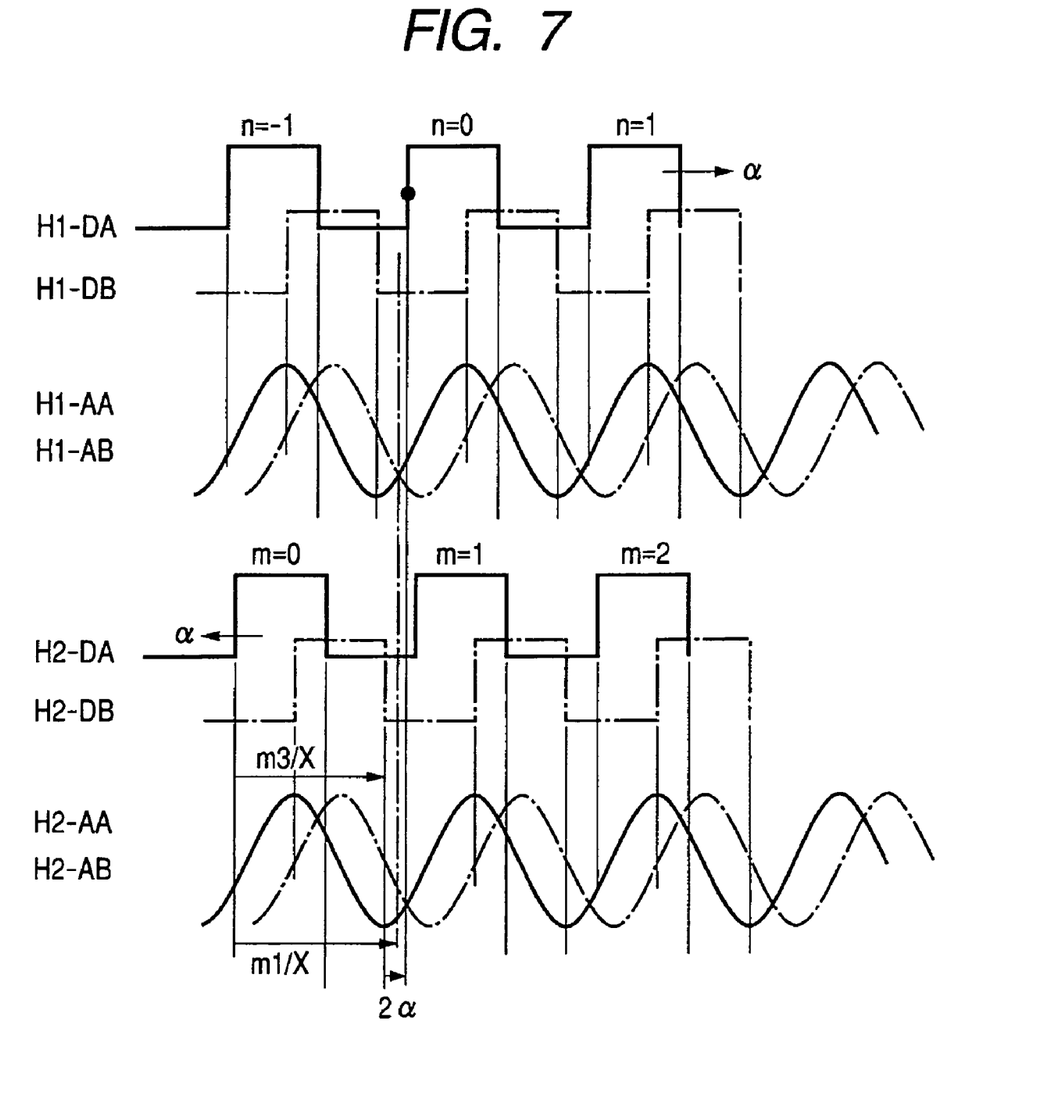
FIG. 7 is a waveform chart of signals in a third embodiment.

FIG. 7 is a waveform chart for illustrating the third embodiment.

Displacement of the phases of output signals from the first and the second detection heads 13 and 14 that may be caused by a environmental change has been described in connection with the first embodiment.

When the first and the second detection heads 13 and 14 are displaced, since the count values of the respective digital values are set to zero at the original point position of the first detection head 13, the digital value of the second detection head 14 is displaced by one pulse from that before the environmental change.

In a normal state before environmental changes, position information obtained from the first and the second detection heads 13 and 14 at the original point position is {zero (signal H1)+m1/X (signal H2)}/2=(m1/X)/2.

The signals of the detection heads 13 and 14 are displaced in opposite directions by amount α due to displacement of the detection heads caused by for example a change in the temperature.

Although the output signal of the first detection head 13 is displaced by +α, the count value of the head 13 is zero, since the original point is set at that point.

Since the output signal of the second detection head 14 is displaced by −α, counter value m1/X is obtained at position m1'/X (designated by a black dot) in FIG. 7.

Therefore, at the pulse edge of the first detection head, the second head provides value m1/X+2α.

Accordingly, the position information obtained at that time, which is the average of the values of the first and the second heads, is {zero (signal H1)+m1/X+2α (signal H2)}/2=(m1/X)/2+α.

As will be understood, this is displaced from the position information before the environmental change by α, and the position whose position information is (m1/X)/2 is the same as the original point position before the environmental change.

Figure 8:
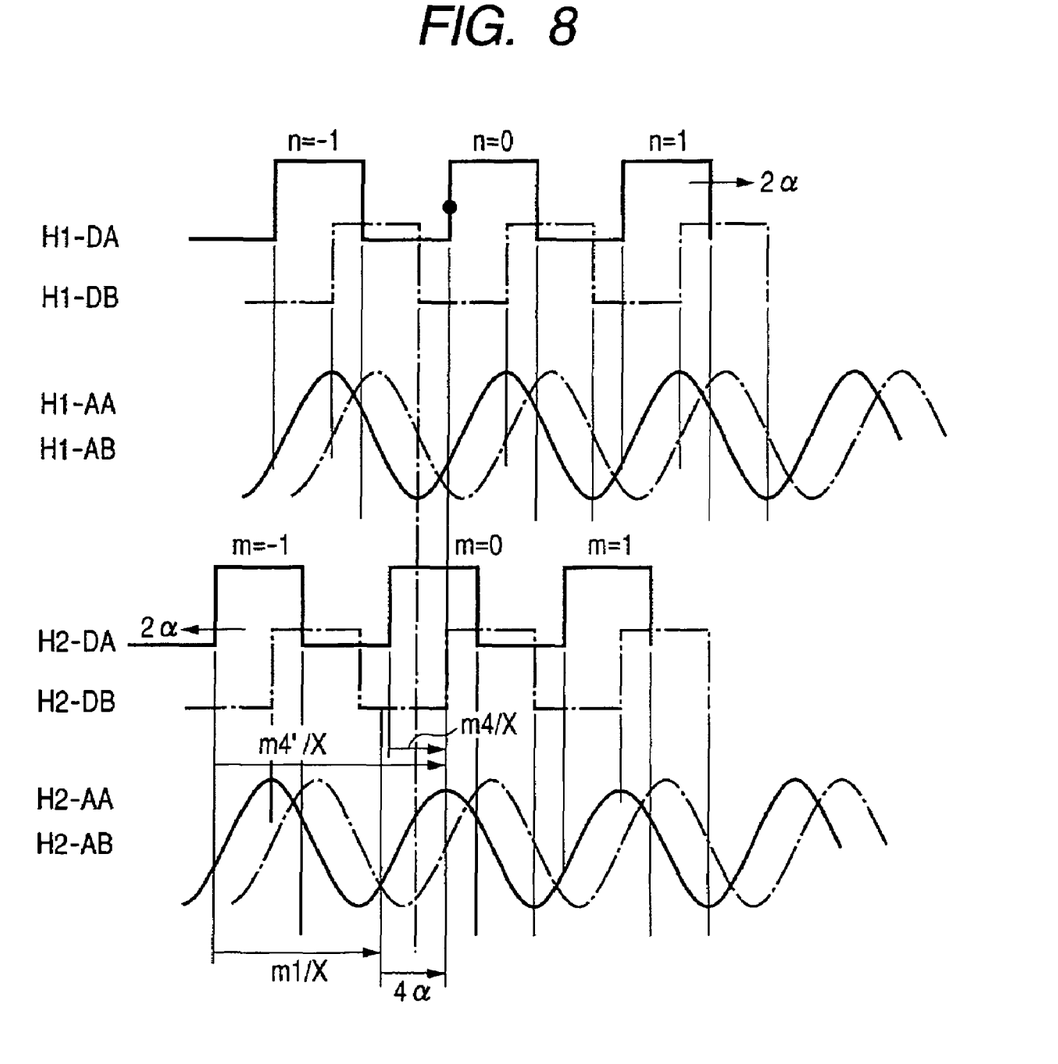
FIG. 8 is a signal waveform chart.

FIG. 8 shows a case where due to a large environmental change, the original position of the first detection head 13 comes one cycle after the digital signal output from the second detection head 14.

Before the environmental change, the digital counter of the second detection head 14 is reset to zero at the original point position of the first detection head 13.

However, since the cycle of the digital signal that has been used as the reference is one more cycle before, the count value m4'/X detected from the analogue signal output from the second detection head 14 must be larger than m1/X.

In practice, however, since the zero position of the digital signal has been changed, the position information of the second detection head 14 is calculated as position from the next digital A phase of the digital signal (m4/X=m4'/X−X of one cycle).

Thus, the position data detected is decreased by just one cycle, and the position of the original point is also detected erroneously.

Figure 9:
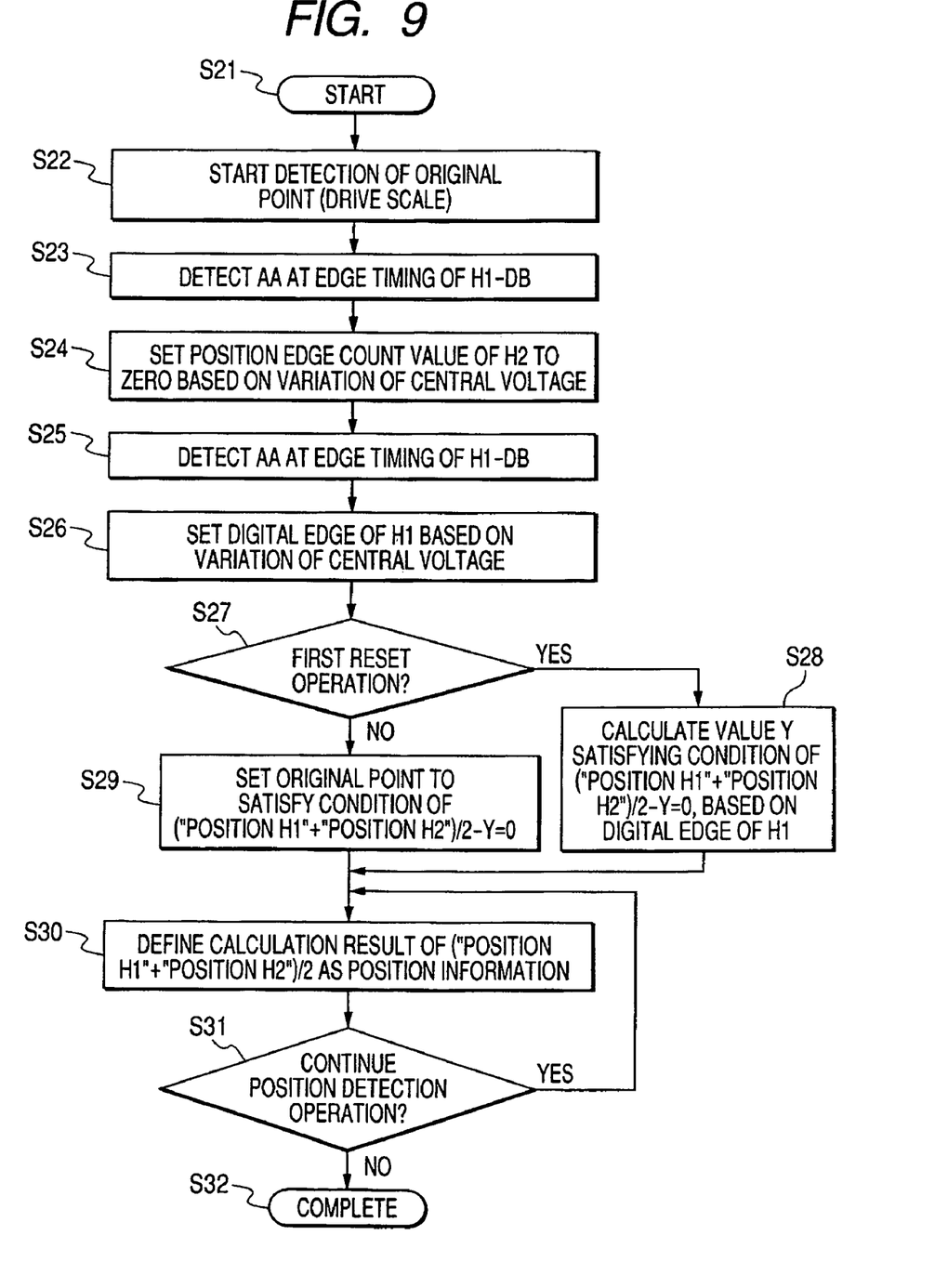
FIG. 9 is a flow chart of a original point detection algorithm.

FIG. 9 is a flow chart of the third embodiment.

In the second detection head 14 also, the position of the original point is detected based on a variation in the amplitude or the central voltage in a similar way as in the first detection head 13, and the digital counter is reset (step S21).

Firstly, the position of the original point is determined based on the offset of the central voltage of the output signal H2 from the second detection head 14 (steps S23, S24).

After that, the position of the original point is determined based on the offset of the central voltage of the output signal H1 from the first detection head 13 in a similar manner as in the second embodiment (steps S25 and S26).

In connection with this, although in the second embodiment the digital count of the second detection head 14 is reset, such resetting is not effected in this process since the absolute position is known from steps S23 and S24.

As per the above, absolute position information of each of the first and the second detection heads 13 and 14 are obtained. By making it possible to detect the digital count of the second detection head 14 as the absolute position, one cycle displacement of the digital counter can be dealt with.

Steps S27 through S32 in this process are the same as steps S15 through S20 in FIG. 6.

Figure 10:
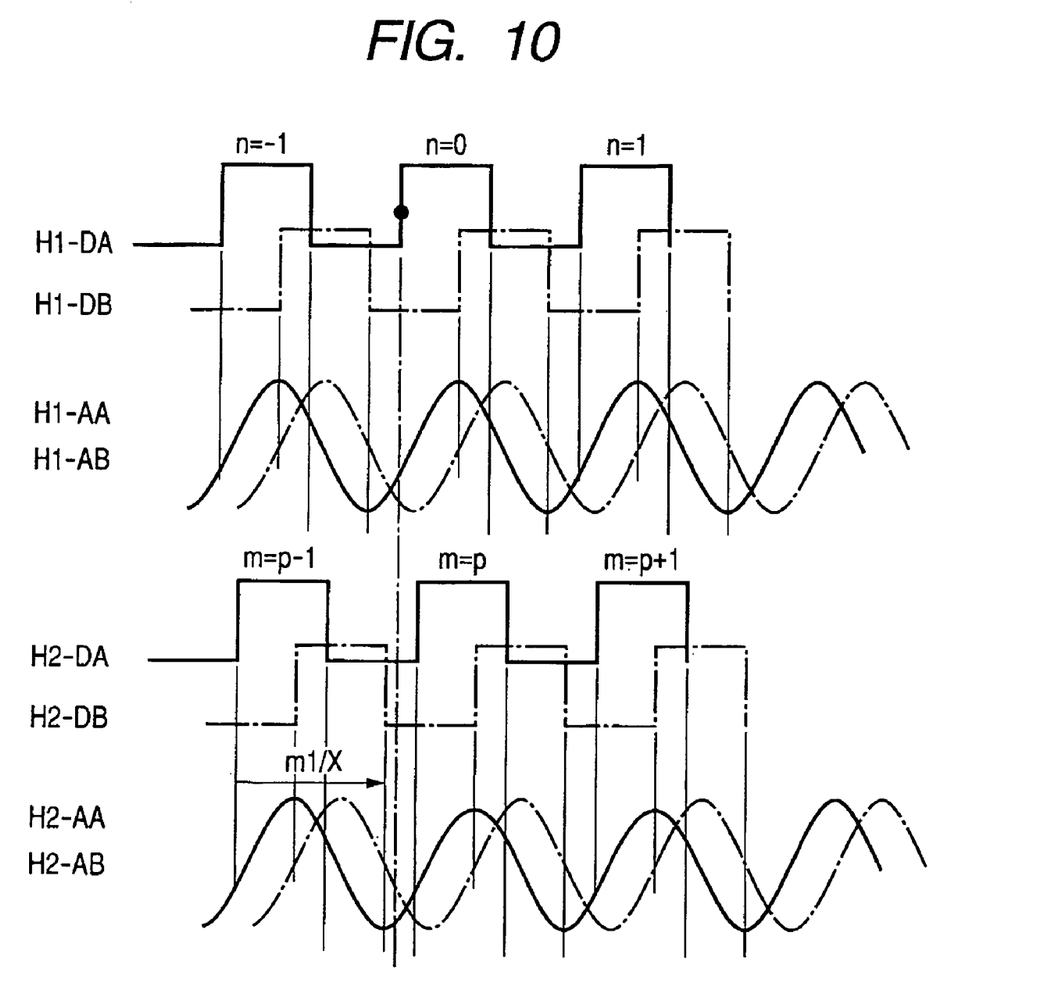
FIG. 10 is a signal waveform chart of a case to which the algorithm is applied.

In FIG. 10, the count value becomes {zero (signal H1)+P−1+m1/X (signal H2)}/2=(P−1+m1/X)/2.

Figure 11:
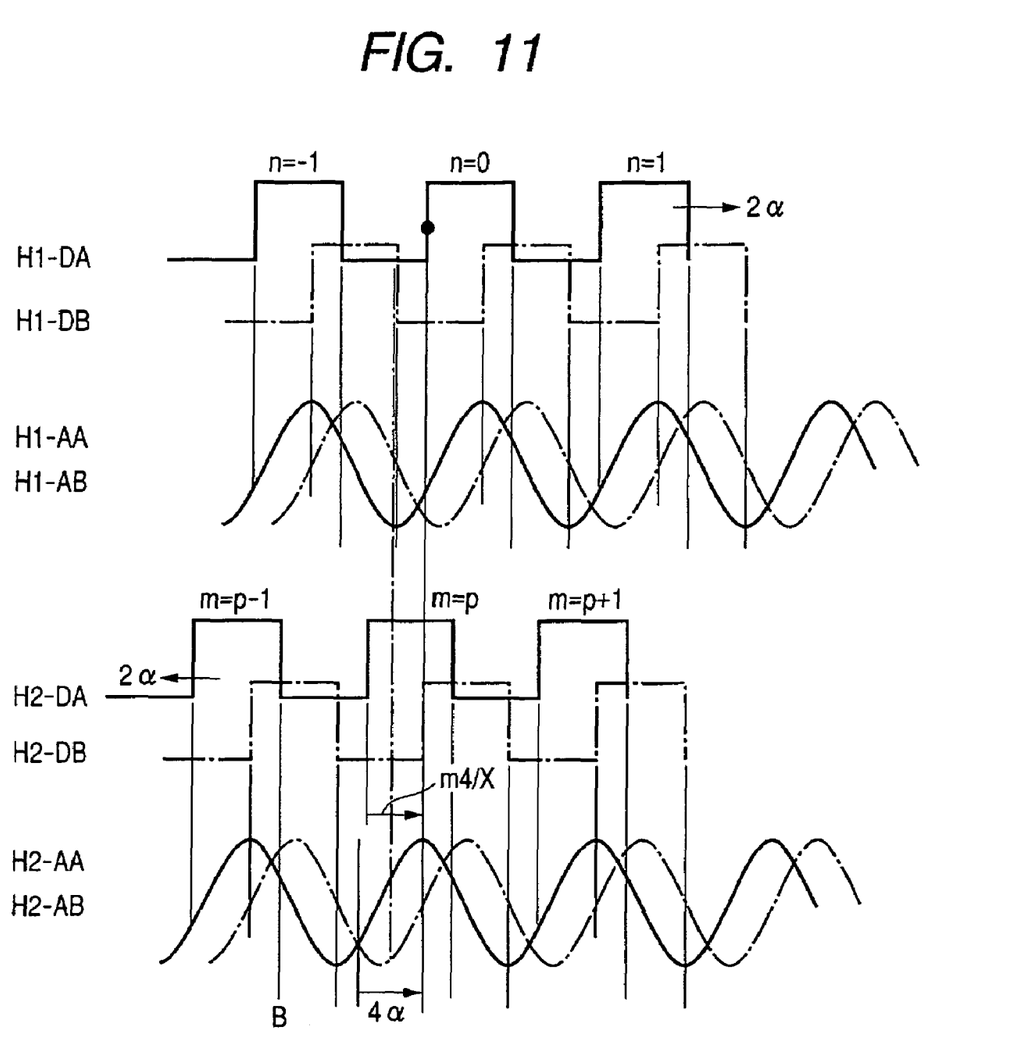
FIG. 11 is a signal waveform chart of a case to which the algorithm is applied.

When displacement of the positions of the first and the second detection heads 13 and 14 occurs as shown in FIG. 11, the count value becomes {zero (signal H1)+P+m4/X (signal H2)}/2=(P+m4/X)/2=(P−1+m1/X+4α)/2=(P−1+m1/X)/2+2α.

Namely, it will be detected that position is displaced from the reset position before the environmental change by 2α.

As per the above, by resetting the counts of the first and the second detection heads 13 and 14 at a specific position and thereafter calculating position information of them, it is possible to detect the original point position without an influence of environmental changes.

The present invention is not limited to the embodiment described in the foregoing, but various changes and modifications may be made to it.

For example, although the scale has a disk-like shape, it may modified to a sector form having a center angle larger than 180 degrees.

Although in the above-described embodiments, the original point position is determined based on offset of the central voltage of the encoder signal that is generated as the discontinuous portion of the scale passes the detection head, the original point position may also be determined by detecting an abrupt decrease in the amplitude of the encoder signal or a steep rise in the current supplied to the light source.

As many apparently widely different embodiments of the present invention can be made without departing from the spirit and scope thereof, it is to be understood that the invention is not limited to the specific embodiment thereof except as defined in the appended claims.

This application claims priority from Japanese Patent Application No. 2005-029336 filed on Feb. 4, 2005, which is hereby incorporated by reference herein.

What is claimed is:

1. An optical encoder comprising:
   a scale having a sector or disk-like shape on which an optical grating including a discontinuous portion is formed, the scale being adapted to rotate about a rotation center;
   a light source for illuminating the scale with light;
   a first detection head and a second detection head, which are movable relative to said scale, the detection heads having a plurality of light receiving sensors arranged in correlation with the pitch of said optical grating to receive light diffracted by said optical grating and output encoder signals, the sensors being composed of a plurality of groups each having a same number of sensors;
   a circuit board on which the first and second detection heads are mounted at different positions such that the first and second detection heads form an angle of approximately 180 degrees with respect to the rotation center of said scale and the direction of the displacement of the detection heads caused by the expansion and contraction of the circuit board is tangential to the sector or disk-like shape; and
   a control portion that calculates relative positional relationship between said scale and said first and second detection heads based on the encoder signals,
   wherein said control portion determines an origin position based on a change in the encoder signals as the discontinuous portion of said scale passes one of said first and second detection heads and determines position information by effecting calculative processing on encoder signals output from said first and second detection heads with reference to the origin position.

2. An optical encoder according to claim 1, further comprising:
   a voltage detecting portion that detects a change in a central voltage of the encoder signals that are generated as the discontinuous portion passes one of said first and second detection heads,
   wherein said control portion determines the origin position based on a detection result of said voltage detecting portion.

3. An optical encoder according to claim 1, further comprising:
   a voltage detecting portion that detects a change in an amplitude of voltage of the encoder signals that are generated as the discontinuous portion passes one of said first and second detection heads,
   wherein said control portion determines the origin position based on a detection result of said voltage detecting portion.

4. An optical encoder according to claim 1, further comprising:
   an origin position store portion for storing the determined origin position information,
   wherein said control portion determines next position information with reference to the stored origin position information.

* * * * *

UNITED STATES PATENT AND TRADEMARK OFFICE
CERTIFICATE OF CORRECTION

| | |
|---|---|
| PATENT NO. | : 7,282,699 B2 |
| APPLICATION NO. | : 11/341627 |
| DATED | : October 16, 2007 |
| INVENTOR(S) | : Akio Atsuta et al. |

It is certified that error appears in the above-identified patent and that said Letters Patent is hereby corrected as shown below:

ABSTRACT:
Line 12, "changes" should read --changes,--.

COLUMN 1:
Line 21, "encoders" should read --encoder--.

COLUMN 2:
Line 14, "compensate" should read --compensate for--.
Line 21, "above mentioned" should read --above-mentioned--.
Line 43, "has" should read --has a--.
Line 49, "heads" should read --heads,--.
Line 50, delete "of which".
Line 50, "sensors" should read --sensors,--.
Line 54, "an" (second occurrence) should read --on--.
Line 64, "degree" should read --degrees--.

COLUMN 3:
Line 3, "changes" should read --changes,--.
Line 6, delete "of".
Line 28, "a" (second occurrence) should read --an--.

COLUMN 4:
Line 1, "form" should read --from--.
Line 13, "i.e." should read --i.e.,--.
Line 34, "characteristics" should read --characteristics,--.
Line 45, "FIG. 3C" should read --FIG. 3C,--.
Line 47, "in 3A," should read --in FIG. 3A,--.

COLUMN 5:
Line 18, "H2AB" should read --H2-AB--.
Line 23, "form" should read --from--.
Line 43, "degree)" should read --degrees)--.

UNITED STATES PATENT AND TRADEMARK OFFICE
CERTIFICATE OF CORRECTION

PATENT NO. : 7,282,699 B2
APPLICATION NO. : 11/341627
DATED : October 16, 2007
INVENTOR(S) : Akio Atsuta et al.

It is certified that error appears in the above-identified patent and that said Letters Patent is hereby corrected as shown below:

COLUMN 6:
Line 30, "becomes" should read --become--.

COLUMN 7:
Line 1, "above described" should read --above-described--.
Line 22, "to" should read --to whether--.
Line 24, "the" (second occurrence) should read --The--.
Line 48, "a" should read --an--.
Line 62, "by" should read --by,--.
Line 62, "example" should read --example,--.

Signed and Sealed this

Seventeenth Day of February, 2009

JOHN DOLL
*Acting Director of the United States Patent and Trademark Office*